United States Patent Office

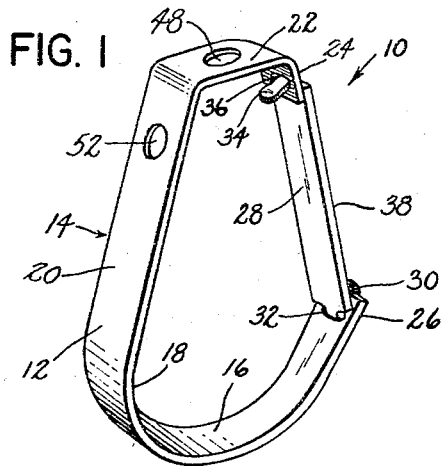
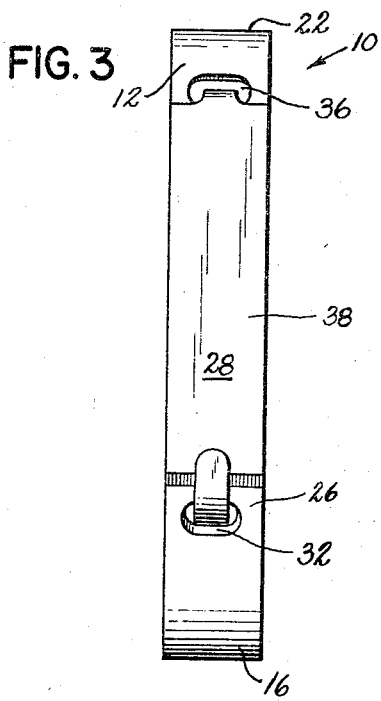
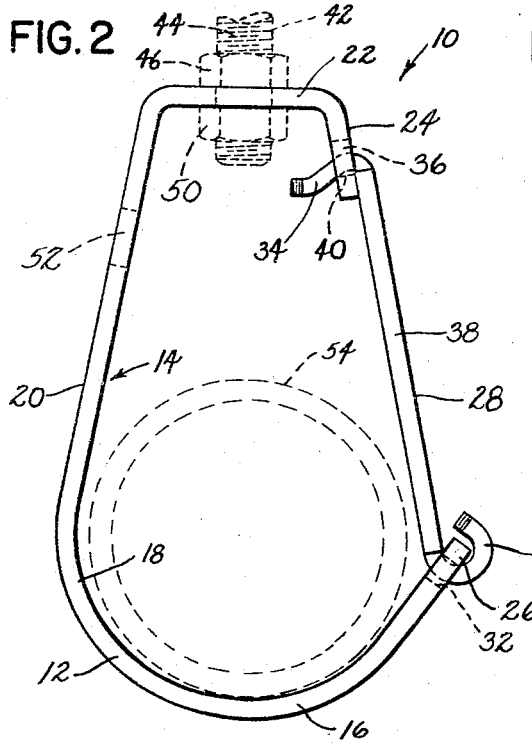
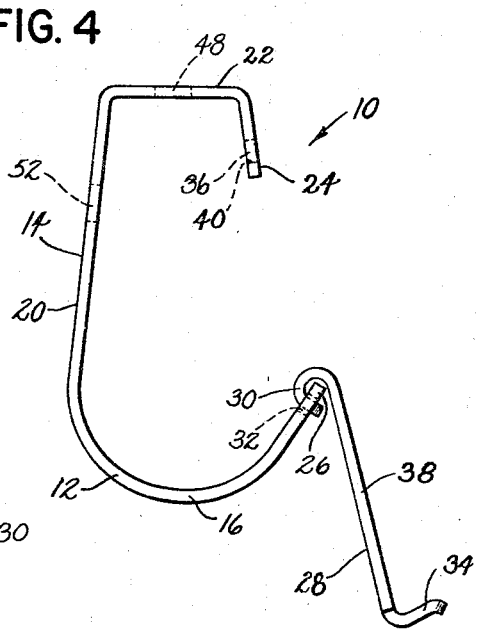

3,323,766
Patented June 6, 1967

3,323,766
PIPE HANGER
Joseph A. Schauster, 22 Cumberland St.,
Manchester, Conn. 06040
Filed Dec. 13, 1965, Ser. No. 513,456
1 Claim. (Cl. 248—62)

This invention relates to a device for hanging or supporting pipes, cables, conduits, and the like and more particularly to an improved pipe hanger which may be hung or suspended in adjusted pipe-supporting position from a threaded supporting rod or bolt.

The general object of the invention is to provide a pipe hanger which permits a pipe or conduit to be placed therein through a side opening after the hanger has been installed in adjusted position; which is provided with gate or latch means to close the pipe-receiving opening and to function to carry a portion of the load supported by the hanger to the supporting rod or bolt; which is adaptable for substantially all pipe-supporting requirements; which may be suspended from an overhead support or hung from a wall; and which is of functional design, having no loose parts to become disassembled and lost or protruding parts to interfere with the installation thereof.

Hangers for supporting pipes, cables, conduits, and the like in pipe-supporting position generally comprise a pipe-receiving portion and frequently include separable means, such as, a supporting nut to secure the hanger in adjusted position suspended from the stud or bolt or the like depending from an overhead supporting structure. Such hangers are commonly used for supporting the network of piping and sprinkler heads of overhead fire prevention sprinkler systems, hydronic heating systems, etc., in which particular care must be exercised to position each hanger in a manner to obtain maximum efficiency of the system. It is obvious that installations requiring a particular pitch to the supported piping can be more easily installed if the hangers may be affixed and adjusted in position before receiving the supported pipe. Nevertheless, the pipe hangers generally in use and most commonly provided for such applications can be secured in adjusted, pipe-supporting position only after receiving the pipe. Obviously this is cumbersome. It is equally bothersome when repairing the supported piping or fixtures thereon to be required to remove the pipe hangers with the pipe, necessitating reinstallation and readjustment of the hangers upon completion of the repair work.

The present invention however, permits hanger installation in adjusted pipe-supporting position prior to receiving the pipe to be supported. It also obviates the present practice of removing the pipe hanger from its adjusted pipe-supporting position when disassembling supported pipe for repairs thereon. The pipe hanger of the present invention is provided with a hinged latch or gate which may be swung open to receive a pipe to be supported in the cradle thereof, which gate may be closed when desired by merely rotating it upwardly to engage the upper portion of the hanger and which in closed position functions to carry a portion of the weight of the supported pipe to the bolt upon which the hanger is secured.

Other objects and advantages of the present invention will become more readily apparent from the following description and drawings which show a preferred embodiment of the invention, and such embodiment will be described; but it will be understood that various changes and modifications may be made from the construction disclosed, and the drawings and description are not to be construed as defining or limiting the scope of the invention, the claims forming a part of the specification being relied upon for that purpose.

In the drawings:

FIG. 1 is a perspective view of a pipe hanger embodying the present invention shown with the gate thereof in closed pipe-supporting position;

FIG. 2 is an enlarged, elevational front view of the hanger shown in FIG. 1, but including a supporting stud and nuts shown in broken lines;

FIG. 3 is an elevational side view of the hanger shown in FIG. 2; and

FIG. 4 is an elevational front view of the hanger of the present invention shown in reduced scale with the gate rotated out of the closed position of FIG. 1 and into open position whereby it may receive the pipe, cable or conduit to be supported.

Referring to the drawings, a pipe hanger generally referred to at 10 is shown comprising an elongated resilient strap 12 which is preferably a sheet metal stamping bent as shown to form a substantially C-shaped body member shown generally at 14, having a pipe-receiving cradle portion 16. The inner end 18 of the cradle 16 extends upwardly as shown to provide a leg 20, the upper end of which is forwardly bent, as shown, to form a mounting portion 22, disposed above the cradle and spaced therefrom by the integral intermediate leg 20. The free, terminal end portion 24 of the mounting portion 22 is disposed above the free end 26 of the cradle 16 and is bent to extend downwardly toward the end 26 of the cradle, as best shown in FIGS. 2 and 4.

A latch or gate 28 is secured to the free end 26 of the cradle by conventional means whereby it is adapted for rotative movement about the end 26 into and out of engagement with the downwardly extending free end 24 of the mounting portion of the hanger 10. A simple means for providing such pivotal movement is shown in the drawings wherein the relieved lower end 30 of the gate is received within an aperture 32 in the free end of the cradle and bent as shown on a radius to secure the lower end of the gate to the cradle to permit rotative movement thereabout.

The opposite or upper end 34 of the gate 28 is constructed and arranged to cooperate with the free end portion 24 of the mounting portion 22 and to be removably received within an aperture 36 therein, thereby to close the opening between the cradle and mounting portion. It can be best seen from FIGS. 2 and 4 of the drawing that the end 34 is preferably bent inwardly as shown to form an included angle of 90° or less with the body portion 38 of the aforesaid gate. As the end 34 is retained within the aperture 36 essentially by frictional resistance, an aforesaid included angle of less than 90° will effectuate a more secure engagement between the inwardly bent end 34 and the bearing surface 40 of the aperture 36. Also if the lineal extent of the gate 28 is slightly less than the distance between the apertures 32 and 34 in the cradle and mounting portions, respectively, advantage can be taken of the natural resilience of the strap 12 to exert a downward force on the gate 28, when in closed position with the end 34 received within the opening 36. It is also apparent that when a load is supported within the cradle, a portion of the downward force exerted thereby will be carried by the gate 28 through the end 34 to the bearing surface 40, further tending to retain the gate in closed position as shown in FIGS. 1 and 2. The gate may be readily opened, however, by directing an upward force against the underside of the cradle to relieve the end 34 from the bearing surface 40 whereby it may be easily rotated to its open position.

In use, the hanger of the present invention is installed by first securing a threaded stud 42 to an overhead support in a manner to permit the threaded portion 44 thereof to extend downwardly as shown in broken lines in FIG. 2 of the drawing. Preferably a positioning nut 46 is threaded to the stud 42 in adjusted position thereon. The hanger 10 may be mounted to the bolt by means of a mounting aperture 48 in the mounting portion through which the stud extends, as shown, and secured in abutting engagement with the underside of the positioning nut 46 by means of a supporting nut 50, preferably of the self-locking type.

A second mounting aperture 52 is provided in the rear leg 20 whereby the hanger of the present invention may, with equal facility, be mounted upon a horizontally disposed bolt extending from a wall in a manner substantially identical to that already described.

When the desired number of hangers have been affixed in adjusted position, it will be recognized by one skilled in the art that piping 54, shown in broken lines in FIG. 2, to be supported thereby may be easily positioned within the cradle of each hanger through the opening therein when the gate has been rotated to open position as in FIG. 4. By rotating the gate upwardly to a closed position as in FIG. 3, the supported pipe is held securely within the cradle 16 of the hanger 10 and the weight thereof is carried to the supporting bolt and nut 50 by the leg 20 and the gate 28.

It is apparent that the present invention thus provides an effective and efficient hanger and is constructed and arranged to receive piping, conduit, or the like after it has been secured, in preadjusted position, to a supporting bolt. It is also apparent that the hanger of the present invention permits the ready removal of the supported pipe or the like for necessary repairs thereto or replacement thereof without the removal of the hanger from its supporting bolt or out of its adjusted position, thereby eliminating the need for reinstalling and readjusting the pipe hanger when the repaired piping is replaced.

The invention claimed is:

A pipe-receiving hanger adapted to be suspended from a threaded stud and comprising a one-piece generally C-shaped resilient body member and a load carrying gate member, both being formed from a metal strap, the lower portion of said body member being bent to provide a pipe-receiving cradle within which a pipe may be supported by said hanger and the upper portion of the said body member being bent to provide an upper mounting portion, a rectilinear leg member disposed between and joining said mounting portion and said cradle in spaced apart relation whereby said body member is closed on three sides and open on the fourth side, said opening being defined by the free ends of the cradle and mounting portion of the body member and acting to provide access to said cradle for a pipe to be supported therein, the free terminal end of the mounting portion being downwardly bent toward the free end of the cradle and formed with aperture means therein, aperture means formed in the free end portion of the cradle, the said gate member comprising an elongated member having one end thereof bent to provide a hook constructed and arranged to cooperate with the said aperture means in the free end of the cradle portion permitting pivotal mounting of the gate to the cradle portion for rotative movement thereabout in a direction toward and away from the free end of the mounting portion, the free terminal portion of the opposite end of the gate being reduced in cross section and bent inwardly at an included angle of less than 90° and arranged to be received in and to coact with the aperture means on the free end of the mounting portion to releasably secure the gate in position closing the said opening and in load supporting condition to carry substantially half the load of the weighted cradle to the mounting portion, and suspending means defined by at least one aperture in said mounting portion spaced from said downwardly bent free end portion thereof to receive the threaded stud whereby the hanger may be suspended from the stud in pipe-supporting position.

References Cited

UNITED STATES PATENTS

| | | | |
|---|---|---|---|
| 1,772,062 | 8/1930 | Zifferer | 248—62 |
| 1,966,899 | 7/1934 | McCabe | 248—62 |
| 2,417,269 | 3/1947 | Robertson | 248—61 |
| 2,616,645 | 11/1952 | Kindorf | 248—62 |
| 2,643,079 | 6/1953 | Pitt | 248—62 |

CLAUDE A. LE ROY, *Primary Examiner.*